United States Patent [19]
Klaila

[11] 4,216,762
[45] Aug. 12, 1980

[54] COMBINED STRUCTURAL SUPPORT AND SOLAR ENERGY SYSTEM

[76] Inventor: William J. Klaila, 399 Marion Rd., Middleboro, Mass. 02346

[21] Appl. No.: 856,418

[22] Filed: Dec. 1, 1977

[51] Int. Cl.² ............................................... F24J 3/02
[52] U.S. Cl. .................................... 126/421; 126/428; 126/431; 126/435; 52/168
[58] Field of Search ............... 126/270, 271, 428, 430, 126/431, 435, 437, 447, 449, 419, 421; 237/1 A; 52/168

[56] References Cited

U.S. PATENT DOCUMENTS

| | | | |
|---|---|---|---|
| 4,000,850 | 1/1977 | Diggs | 126/271 |
| 4,012,875 | 3/1977 | Hirsh | 52/168 |

*Primary Examiner*—Carroll B. Dority, Jr.
*Assistant Examiner*—Lee E. Barrett
*Attorney, Agent, or Firm*—Morse, Altman, Oates & Bello

[57] ABSTRACT

A combined structural support and solar energy system with parallel joists having tubular upper chords defining conduits through which a fluid circulates for collection of solar energy and tubular lower chords defining conduits through which a fluid circulates for radiant heating and panel cooling.

14 Claims, 7 Drawing Figures

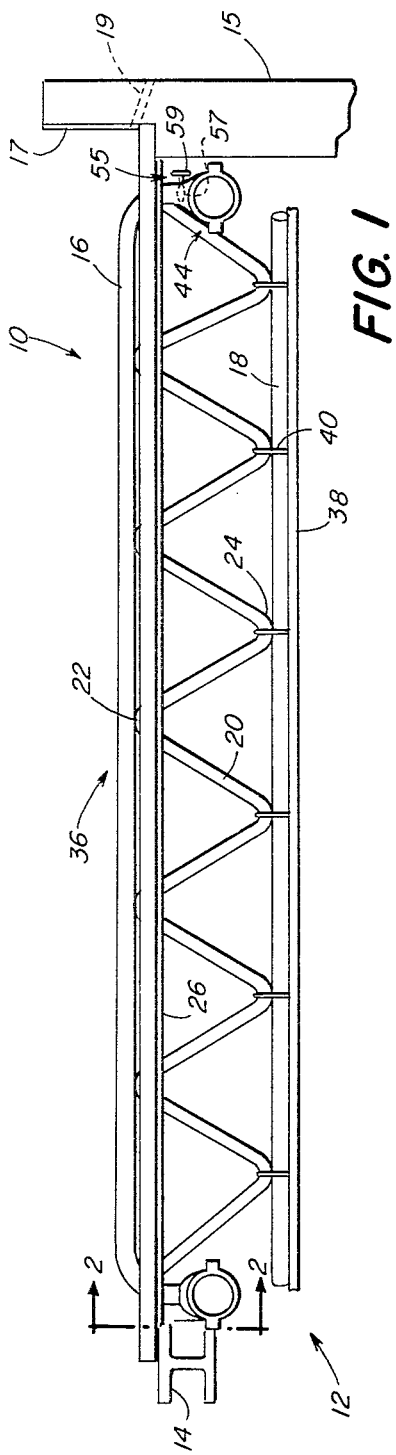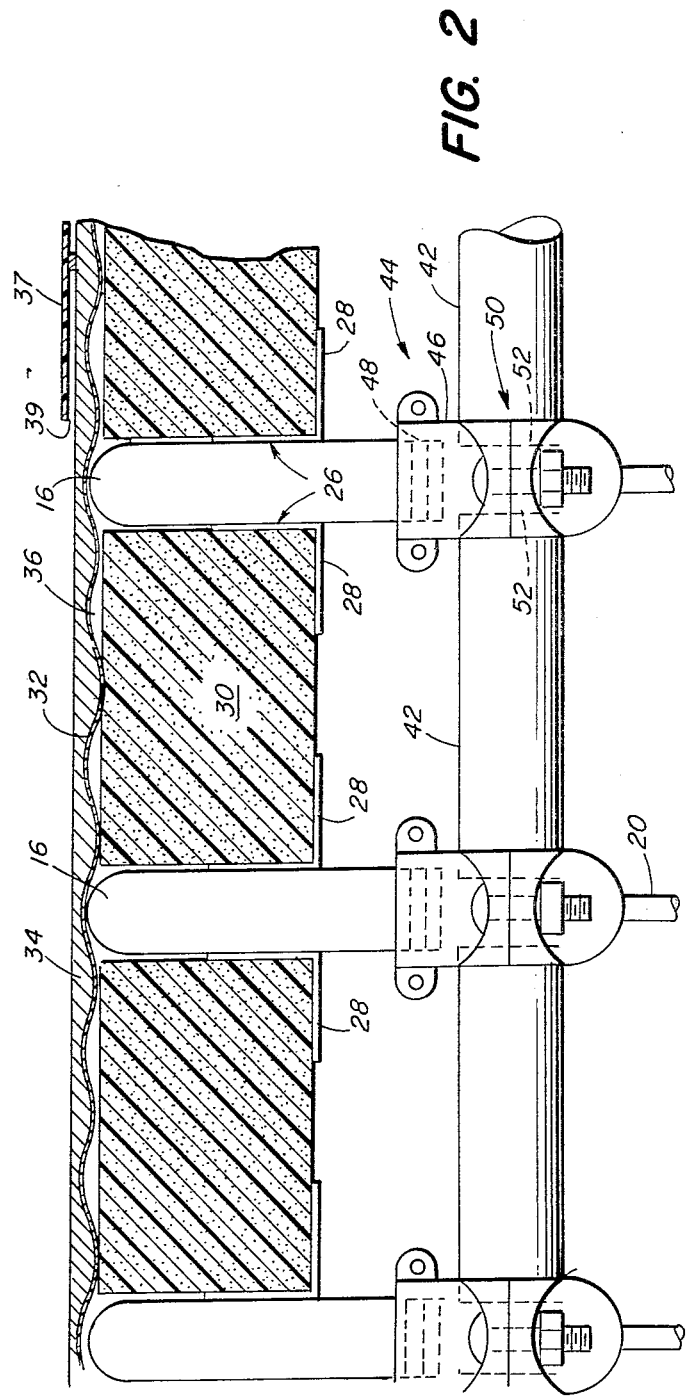

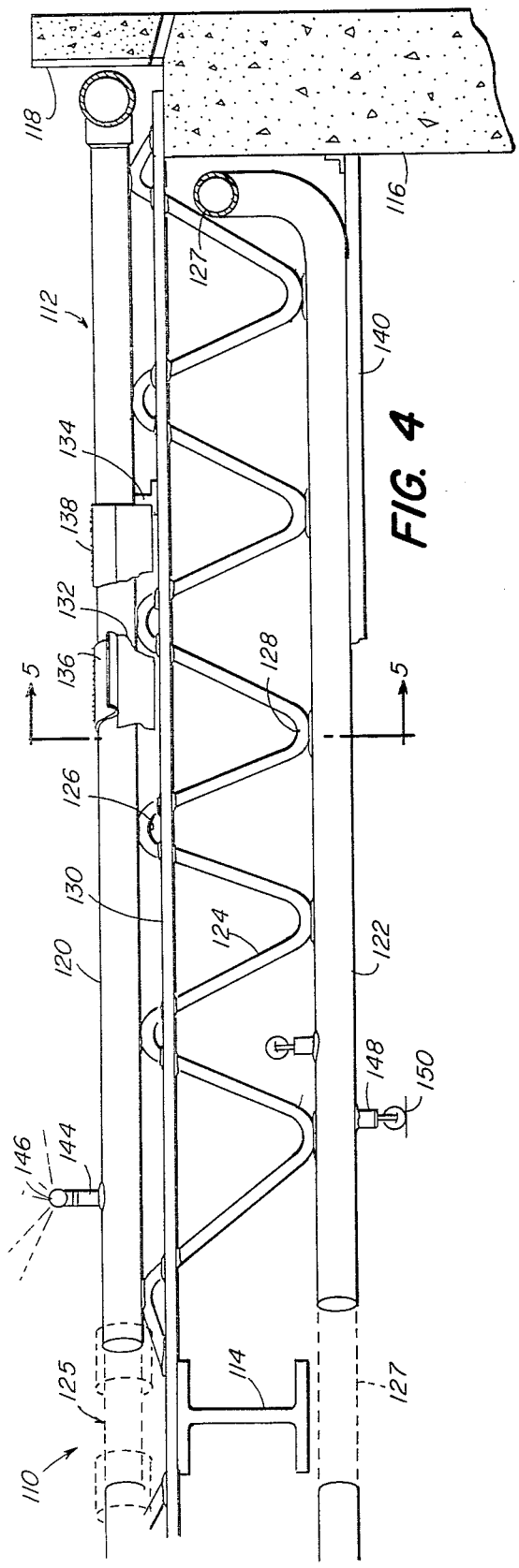
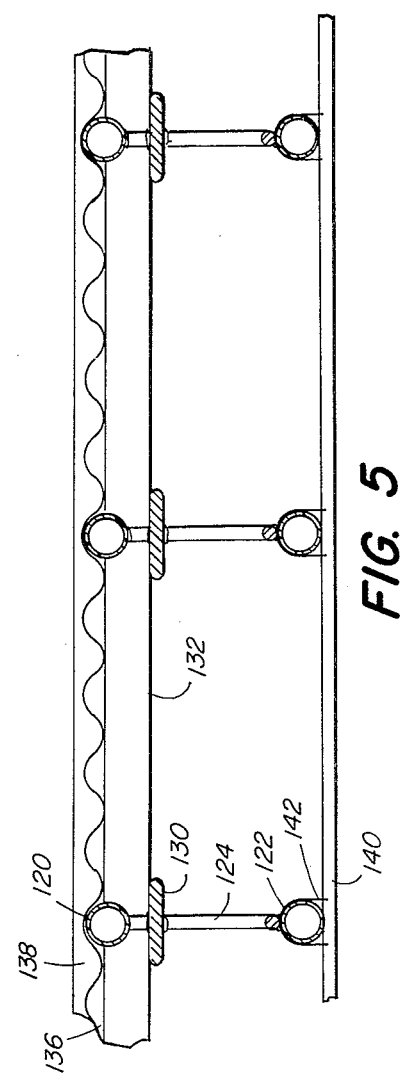
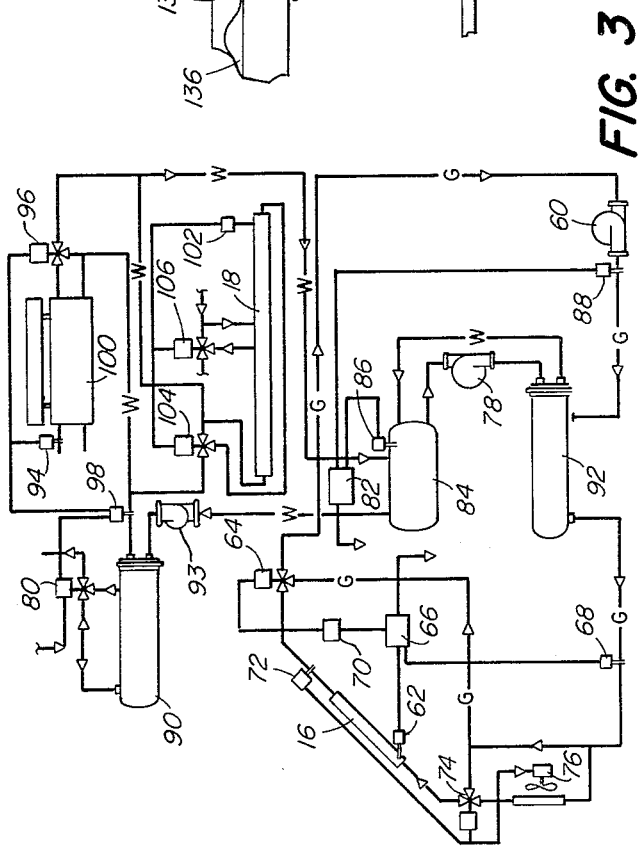

COMBINED STRUCTURAL SUPPORT AND SOLAR ENERGY SYSTEM

BACKGROUND OF THE INVENTION

1. Field of the Invention

The present invention relates to building construction and, more particularly, is directed towards a combined structural support and solar energy system for building use.

2. Description of the Prior Art

Due to the increased cost of materials and labor, combined structural supports for building construction have been designed. One type of combined structural support having lower tubular chords through which water circulates for fire sprinkler nozzles is described in U.S. Pat. No. 4,012,875.

Over the past several years, extensive effort has been expended on the design of solar heating systems. In many cases, the building structure is designed with additional support members to carry the solar collector which require structural supports independent of the building structure. Often times, it has been found that the increased capital expense required to accomodate the solar system exceeds the expected cost savings and is not warranted. A need has risen for a solar energy system which does not appreciably increase the costs of building construction.

SUMMARY OF THE INVENTION

It is an object of the present invention to provide a solar energy system which does not appreciably increase building construction costs.

Another object of the invention is to provide a combined structural support and solar energy system.

A further object of the invention is to provide a structural support for building use which includes a solar collector. The structural support includes parallel joists with upper and lower tubular chords. A fluid flows through the upper chords for collection of solar energy and a fluid flows through the lower chords for radiant heating.

Yet another object of the invention is to provide a combined structural support and solar energy system with parallel joists having upper tubular chords for collection of solar energy and lower tubular chords for radiant heating. A roof sprinkler system is connected to the upper chord for evaporative cooling and a fire sprinkler system is connected to the lower chord for extinguishing fires.

Other objects of the present invention will in part be obvious and will in part appear hereinafter.

The invention accordingly comprises the apparatuses and systems, together with their parts, elements and interrelationships that are exemplified in the following disclosure, the scope of which will be indicated in the appended claims.

BRIEF DESCRIPTION OF THE DRAWINGS

A fuller understanding of the nature and objects of the present invention will become apparent upon consideration of the following detailed description taken in connection with the accompanying drawings, wherein:

FIG. 1 is a side elevation of a combined structural support for a solar energy system embodying the invention;

FIG. 2 is a cross-sectional view taken along the lines 2—2 in FIG. 1;

FIG. 3 is a schematic diagram of a solar energy system embodying the invention;

FIG. 4 is a side elevation of an alternate embodiment of the invention;

FIG. 5 is a cross-sectional view taken along the lines 5—5 of FIG. 4;

DETAILED DESCRIPTION OF THE PREFERRED EMBODIMENT

Figure 6:
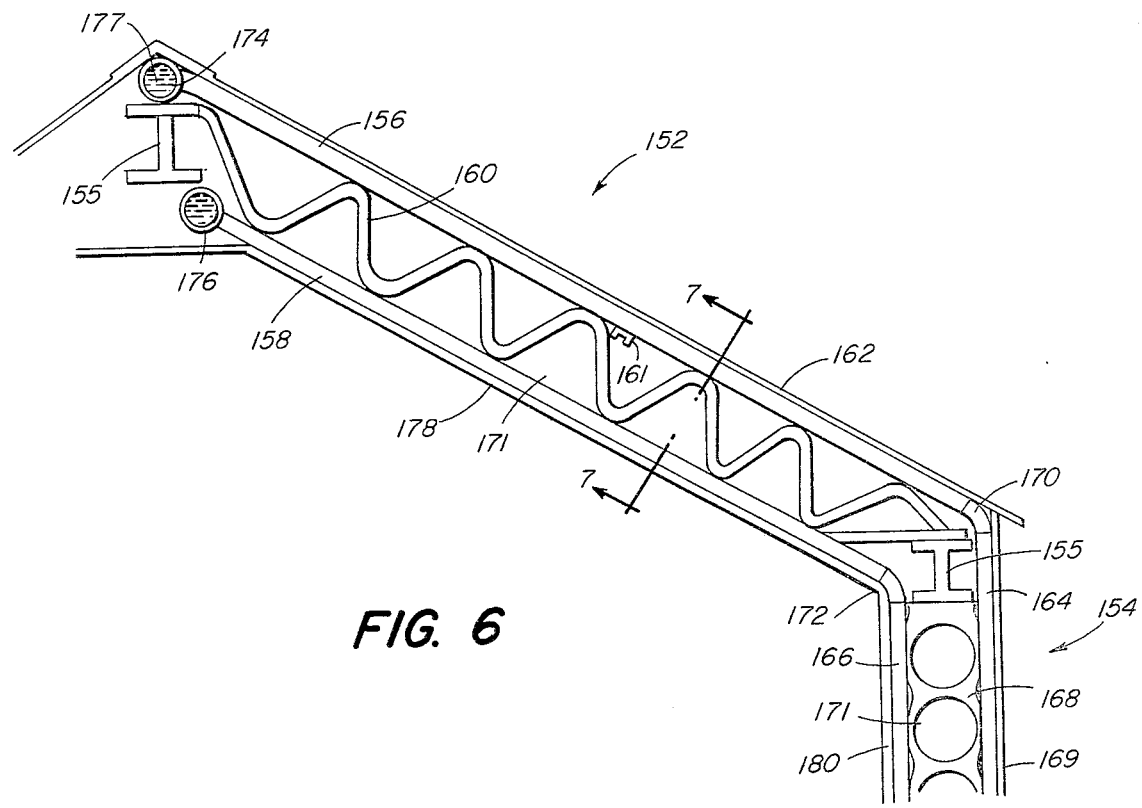
FIG. 6 is side elevation of further embodiment of the invention.

Referring now to the drawings, particularly FIGS. 1 and 2, a combined structural support and solar energy system 10 for building construction embodying the invention includes open web joists 12 which span between girders 14 and a wall 15, for example a parapet wall with a reflective inner surface 17. Preferably, walls 15 and reflective surfaces 17 extend high enough at the north, east and west sides of the building to minimize wind cooling and enhance heat collection. Walls 15 are provided with drain ports 19 for removal of water. Each joist 12 has a tubular upper chord 16 which defines a solar collector and a tubular lower chord 18 which constitutes a radiant heating source. A fluid, for example an anti-freeze solution such as glycol, circulates through upper chords 16 and lower chords 18, solar energy being collected in the upper chords and radiated from the lower chords into the area below. Upper chord 16 and lower chord 18 of each joist 12 are held in spaced relationship by a web rod 20 having a generally serpentine configuration with upper bends 22 and lower bends 24. Upper chord 16 is attached to web rod 20 at upper bends 22 and lower chord 18 is attached to web rod 20 at lower bends 22, one method of attachment being welding, for example. A pair of angle brackets 26 are welded to opposite side of each upper chord 16 and web rods 20. An extending foot portion 28 of each angle bracket 26 constitutes a shelf which supports insulation material 30, for example rigid insulation sheets. The upper face of insulation 30 is disposed slightly below the upper surface of upper chords 16. A metal deck 32 having a substantially sinuous profile in right cross section is placed on insulation 30 and is tack welded to upper chords 16. A solar energy absorbing stratum 34, for example a roof covering 34 such as tar and roofing paper, is applied in a conventional manner on the exposed upper surface of metal deck 32. Framed transparent covers 37 composed of glass, polyethylene terephtalate resin, or polyvinyl chloride for example, are positioned on roof 34, an air space 39 formed between covers 37 and roof 34. Preferably, additional insulation material 36 is applied to the spaces between insulation 30 and metal deck 32. A heat radiating stratum, for example a ceiling 38, preferably a metal ceiling composed of aluminum panels, is suspended by hangers 40 from web rods 20 and is operative to transfer radiant heat from lower chords 17 to the area below. In an alternative embodiment, lower chords 18 are positioned in the walls and/or in the floor of a building.

Each upper chord 16 slopes downwardly from an elevated central portion towards the ends of the chord to provide a pitch for draining each of the chords. The end portions of each upper chord 16 are turned downwardly towards ceiling 38 in order to maintain the integrity of roof 34 for the prevention of leaks and to provide access to each of the upper chords for maintenance purposes after the roof is completed. The ends of each upper chord 16 are connected to a collector header 42 by means of a coupling assembly 44. In the preferred embodiment coupling assembly 44 is a valve-coupling assembly which includes a head and gasket portion 46 that is fitted over an annular groove 48 formed in upper chord 16 adjacent its end, and a through-feed flange and gasket portion 50 that is fitted over grooves 52 formed in adjacent sections of collector header 42. Head and gasket portion 46 is provided with a control valve 55, for example a butterfly valve 57 having an externally accessible handle 59. The interconnection of upper chords 16 and collector header 42 by means of head and gasket portion 46 and through-feed flange and gasket portion 50 permits expansion and contraction due to environmental changes without subjecting structural support and solar energy system 10 to undue stress. As shown in FIG. 3, upper chords 16 are connected to lower chords 18 through suitable solar energy system components now to be described.

FIG. 3 shows a basic two-circuit system with glycol utilizing nonstratified storage. In this system a pump 60 starts when a temperature sensor 62 senses that the transfer fluid in collectors 16 has reached a specified level, for example 100° F. A three-way valve 64 is positioned to allow flow from collectors 16 by a differential temperature controller 66 whenever the transfer fluid temperature is, for example, 10° F. higher at temperature sensor 62 in the collectors than the fluid temperature in the system return at a temperature sensor 68. A timer 70 provides minimum collector-on-time by keeping pump 60 on and three-way valve 64 open to collectors 16 for a specified time, stabilizing the collector temperature and preventing short cycling. Differential temperature controller 66 closes valve 64 to collectors 16 whenever the temperature at sensor 62 is, for example, less than 2° F. higher than the temperature at temperature sensor 68. A temperature controller 72 opens a three-way valve 74 and cycles a purge fan 76 to prevent the discharge temperature at collectors 16 from exceeding 240° F., for example. The operation of a storage pump 78 is interlocked with collector valve 64 and an auxiliary heat exchanger valve 80. When valve 64 is bypassing collectors 16, differential temperature controller 82 starts pump 78 to allow flow through a storage tank 84 if the storage temperature at temperature sensor 86 is 5° F. or more, for example, higher than the system return temperature at a temperature controller 88, allowing the discharge of stored heat. When the temperature at temperature sensor 86 is, for example, less than 1° F. higher than the temperature at sensor 88, temperature sensor 82 stops pump 78.

When valve 64 is open to flow from collectors 16 and valve 80 is bypassing a heat exchanger 90, temperature controller 82 starts pump 78 to allow flow through storage tank 84 and a heat exchanger 92. The stored fluid is charged or discharged depending upon relative temperatures of return and storage fluids. A pump 93 is provided for circulating fluid through lower chords 18 and heat exchanger 90. With valve 64 open to collectors 16 and valve 80 open to heat exchanger 90, sensor 82 causes a bypass of storage tank 84. This is to provide for storage only of the heat collected from the sun and retains heat generated from conventional sources within the system loop. It will be appreciated that a reverse flow of heated fluid through upper chords 16 can be used to prevent snow accumulation on roof 34.

A chilled water controller 94 activates valves 80 and 96 in sequence in order to maintain the chilled water supply temperature at a predetermined setting. A lower limit controller 98 is provided at controller 94 for preventing the supply temperature at an absorbtion air-conditioner 100 from falling below 200° F., for example, by positioning valve 80 to allow the flow of boiler water through heat exchanger 90. For outside air heating, a discharge controller 102 actuates valves 104 and 102 in sequence to maintain the discharge setting through lower chords 18 at a predetermined setting. These two valves operate in sequence to ultilize solar energy before using boiler water.

Referring now to the alternate embodiment of FIGS. 4 and 5, a combined structural support and solar energy system 110 includes open web joists 112 which span between girders 114 and a wall 116, for example a parapet wall with a reflective inner surface 118. Preferably, walls 116 and reflective surfaces 118 extend high enough at the north, east and west sides to minimize wind cooling and enhance heat collection. Each joist 112 has a tubular upper chord 120 which defines a solar collector and a tubular lower chord 122 which constitutes a radiant heating source. A fluid, for example an anti-freeze solution as glycol, circulates through upper chords 120 and lower chords 122, solar energy being collected in the upper chords and radiated from the lower chords into the area below. Upper chord 120 and lower chord 122 of each joist 112 are held in spaced relationship by a web rod 124 having a generally serpentine configuration with upper bends 120 and lower bends 128. In an alternative embodiment, upper chord 120 and lower chord 122 of each joist 112 are held in spaced relationship by a perforated plate. Upper chord 120 is attached to web rod 124 at upper bends 126 and lower chord 122 is attached to web rod 124 at lower bends 128, one method of attachment being welding, for example. Upper chords 120 are interconnected in series or in parallel by fitting or expansion joints 125 and lower chords 122 are interconnected in series or parallel by fittings or expansion joints 127.

A shelf 130, which is attached to web rod 124 below each upper chord 120, carries an insulation material 132, for example rigid insulation sheets. The upper face of insulation 132 is disposed below the upper surface of upper chords 120, spacers 134 having substantially T-shaped profiles in right cross-section being located between shelf 130 and upper chords 120. A metal deck 136 having a substantially sinuous profile in right cross section is placed on insulation 132 and is tack welded to upper chords 120. A roof covering 137, such as tar and dark colored gravel, is applied in a conventional manner on the exposed upper surface of metal deck 136. A ceiling 140 is suspended by hangers 142 from web rods 124. Ceiling 140 is a metal ceiling, preferably aluminum ceiling panels that are operative to transfer radiant heat from lower chords 122 to the area below. Connectors 144, which are welded into the upper chords 120, are fitted with spray nozzles 146 through which water is sprayed onto roof 138 for evaporative cooling purposes. This system can be used in conjunction with a chilled water cooling system in place of a cooling tower by collecting cooled water from roof 138 and by returning it to a condenser system of the chiller using present art methods. Solar and/or conventionally heated water or solution is temperature controlled and circulated 11. The structural support and solar energy system as claimed in claim 10 including nozzle means connected to said first chords and extending through said roof, said fluid in said first chords sprayed from said nozzle means for evaporative cooling of said roof.

12. A structural support and solar energy system for use in building construction and comprising:
 (a) a plurality of joists, each said joist including an upper tubular chord, a lower tubular chord and a web, said upper chord and said lower chord secured to said web, each said upper chord configured to have a first fluid flow therein and each said lower chord configured to have a second fluid flow therein;
 (b) a solar heat absorbing stratum mounted to said upper chords;
 (c) a heat radiating stratum depending from said lower tubular chords; and
 (d) first and second pump means connected to said upper chords and said lower chords, respectively, for circulating said first fluid in said upper chords and said second fluid in said lower chords;
 (e) heat exchanger means connected to said first and second chords for transferring heat between said first and second fluids circulating therein; and
 (f) said solar heat absorbing stratum heated by solar energy, the temperature of said first fluid in said upper chords elevated by said heated solar heat absorbing stratum, said heated fluid in said upper chords heating said second fluid in said lower chords, said heat radiating stratum heated by said heated fluid in said lower chords, an area below said heat radiating stratum radiantly heated by said heated heat radiating stratum.

13. The structural support and solar energy system as claimed in claim 12 wherein said solar heat absorbing stratum includes a roof and walls with reflective surfaces bounding selected sides of said roof.

14. A structural support and solar energy system for use in building construction and comprising:
 (a) a plurality of joists, each said joist including an upper tubular chord, a lower tubular chord and a web, said upper chord and said lower chord secured to said web, each said upper chord configured to have a first fluid flow therein and each said lower chord configured to have a second fluid flow therein;
 (b) a solar heat absorbing stratum mounted to said upper chords;
 (c) heat exchanger means connected to said upper and lower chords for transferring heat between said first fluid in said upper chords and said second fluid in said lower chords;
 (d) valve means operatively connected to said heat exchanger means and said upper chords, said valve means having activated and deactivated states, fluid circulating through said heat exchanger means only when said valve means is in said activated state;
 (e) a radiaing stratum depending from said lower tubular chords; and
 (f) first and second pump means connected to said upper chords and said lower chords, respectively, for circulating said first fluid in said upper chords and said second fluid in said lower chords;
 (g) said solar heat absorbing stratum heated by solar energy, the temperature of said first fluid in said upper chords elevated by said solar heat absorbing stratum, said heated fluid in said upper chords heating said second fluid in said lower chords, said radiating stratum heated by said heated fluid in said lower chords, an area below said radiating stratum radiantly heated by said heated radiating stratum.

* * * * * through lower chords 122 in the manner described in connection with FIGS. 1, 2 and 3. Couplings 148 are welded into the lower chords 122 and sprinkler heads 150 are connected to the couplings 148. Sprinkler heads 150 are fused to discharge at a specified temperature, for example 165° F., for fire control.

Figure 7:
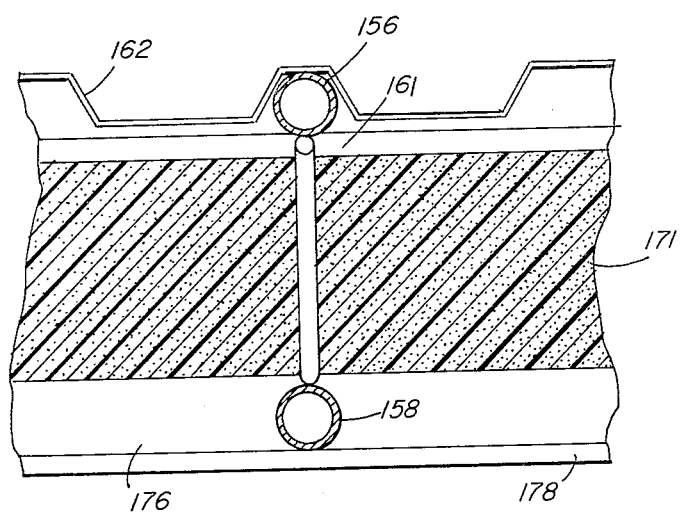
FIG. 7 is a cross-sectional view taken along the lines 7—7 in FIG. 6.

Referring now to FIGS. 6 and 7, there is shown a roof joist 152 and a wall joist 154. Roof joist 152 spans between girders 155 and includes an upper tubular chord 156 and a lower tubular chord 158. A web rod 160 is welded to upper chord 156 and lower chord 158. Although only one roof joist 152 is shown, it is to be understood that there are a plurality of joists 152 which are mounted parallel to one another. Stiffeners 161 are attached to joists 152 for mounting a dark colored metal deck 162 at the outer surface of upper chords 156.

Wall joist 154 includes an outer tubular chord 164 and an inner tubular chord 166. A perforated metal plate 168 is welded to outer chord 164 and inner chord 166. It is to be understood that, although one wall joist is shown, a plurality of wall joists 154 are mounted in spaced parallel relationship to one another. A metal siding 169 is mounted at the outer surface of wall joists 154. An insulation material 171 is placed between upper and lower chords 156, 158 and between inner and outer chords 164, 166.

Upper chords 156 are connected to outer chords 164 by suitable couplings 170 and lower chords 158 are connected to inner chords 166 by suitable couplings 172. The free ends of upper chords 156 are connected to a header 174 and the free ends of lower chords 158 are connected to a header 176. Although not shown, the free ends of outer and inner chords are connected to headers.

A fluid 177, for example an anti-freeze solution or water, is circulated through upper chords 156 and header 170. Circulating fluid 177 collects solar heat from metal deck 162 and the heated fluid is circulated to a central heating plant and solar storage system of the type described in conjunction with FIG. 3. The stored fluid is distributed through lower chords 158 which are embedded in a lath and plaster ceiling 178 and through inner chords 166 which are embedded in a lath and plaster wall 180. In alternative embodiments, ceilings 178 and wall 180 are other than lath and plaster, for example metal or tile. The heated fluid which circulates in lower chords 156 and inner chords 166 heats the space enclosed by the walls and roof.

Since certain changes may be made in the foregoing disclosure without departing from the scope of the invention herein involved, it is intended that all matter contained in the above description and depicted in the accompanying drawings be construed in an illustrative and not in a limiting sense.

What is claimed is:

1. A structural support and solar energy system for use in building construction, said system comprising:
    (a) a plurality of joists, each said joist including a first chord through which a first fluid flows and a second chord through which a second fluid flows, and a web to which said first and second chords are attached;
    (b) a solar energy absorbing stratum mounted to said first chords for heating said first fluid in said first chords, said first chords defining a solar collector;
    (c) first pump means connected to said first chords for circulating said first fluid;
    (d) second pump means connected to said second chords for circulating said second fluid; and
    (e) heat exchanger means connected to said first chords and said second chords, said first heated fluid circulated through said heat exchanger means for transferring heat between said first fluid in said first chords and said second fluid in said second chords.

2. The structural support and solar energy system as claimed in claim 1 wherein each said first chord is a tubular chord and wherein each said second chord is a tubular chord.

3. The structural support and solar energy system as claimed in claim 2 wherein said solar energy absorbing stratum is a wall.

4. The structural support and solar energy system as claimed in claim 2 wherein said solar energy absorbing stratum is a roof.

5. The structural support and solar energy system as claimed in claim 4 including a ceiling depending from said second chords, said ceiling defining a heat source that is operative to transfer heat from said lower chords to a space below said ceiling.

6. A structural support and solar energy system for use in building construction and comprising:
    (a) a plurality of joists, each said joist including first tubular chords, second tubular chords and a web, said first chords and said second chords mounted to said web in spaced relationship, said first chords configured to have a first fluid flow therein and said second chords configured to have a second fluid flow therein;
    (b) solar energy absorbing means mounted to said first chords for heating said first fluid in said first chords, said first chords constituting a solar collector;
    (c) first and second pump means connected to said first chords and said second chords, respectively, for circulating said first fluid in said first chords and said second fluid in said second chords;
    (d) heat exchanger means connected to said first and second chords for transferring heat between said first fluid in said first chords and said second fluid in said second chords; and
    (e) radiant heat means mounted to said second chords, said radiant heat means operative to transfer heat from said second fluid in said second chords to an area adjacent said radiant heat means.

7. The structural support and solar energy system as claimed in claim 6 wherein said solar energy absorbing means is a roof.

8. The structural support and solar energy system as claimed in claim 6 wherein said solar energy absorbing means includes a tar composition roof and reflective surfaces on selected walls of the building bounding said roof.

9. The structural support and solar energy system as claimed in claim 8 including a first header and a second header, said first chords operatively connected to said first header, said second chords operatively connected to said second header, said first header and said second header operatively connected to said first and second means for circulating, respectively.

10. The structural support and solar energy system as claimed in claim 9 including coupling means for connecting said first chords and said first header, said coupling means including valve means for controlling the flow rate of said fluid circulated in said first chords.